United States Patent [19]

Solomon

[11] 4,007,374

[45] Feb. 8, 1977

[54] IONIZATION DETECTOR WITH IMPROVED RADIATION SOURCE

[75] Inventor: Elias F. Solomon, Duxbury, Mass.

[73] Assignee: Gulf & Western Manufacturing Company (Systems), New York, N.Y.

[22] Filed: Sept. 11, 1975

[21] Appl. No.: 612,350

Related U.S. Application Data

[63] Continuation-in-part of Ser. No. 593,704, July 7, 1975.

[52] U.S. Cl. .............................. 250/384; 250/381; 250/385

[51] Int. Cl.[2] ........................................ G01T 1/18

[58] Field of Search .......... 250/381, 382, 384, 385, 250/389, 393, 394, 395

[56] References Cited

UNITED STATES PATENTS

| | | | |
|---|---|---|---|
| 2,976,677 | 3/1961 | Taylor | 250/384 X |
| 3,018,376 | 1/1962 | Vanderschmidt | 250/384 |
| 3,728,706 | 4/1973 | Tipton et al. | 250/381 X |
| 3,870,888 | 3/1975 | Lovelock | 250/384 |

*Primary Examiner*—Davis L. Willis
*Attorney, Agent, or Firm*—Wolf, Greenfield & Sacks

[57] ABSTRACT

The detector comprises a chamber having at least one radiation source disposed therein. The chamber includes spaced collector plates which form a part of a detection circuit for sensing changes in the ionization current in the chamber. The radiation source in one embodiment is in the form of a wound wire or ribbon suitably supported in the chamber and preferably a source of beta particles. The chamber may also include an adjustable electrode and the source may function as an adjustable current source by forming the wire or ribbon in an eliptical shape and rotating the structure. In another embodiment the source has a random shape and is homogeneously disposed in the chamber.

13 Claims, 5 Drawing Figures

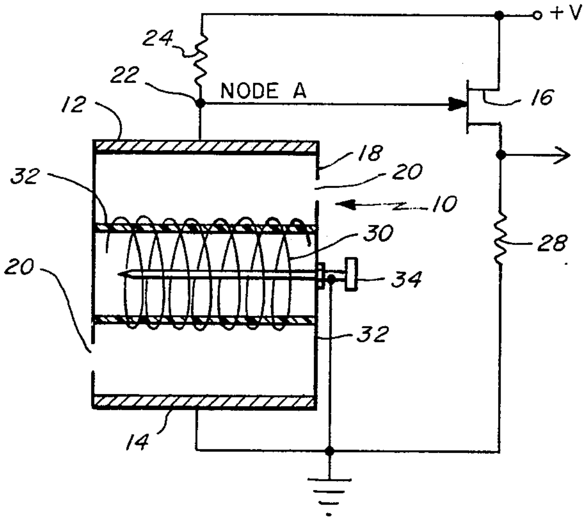
FIG. 1
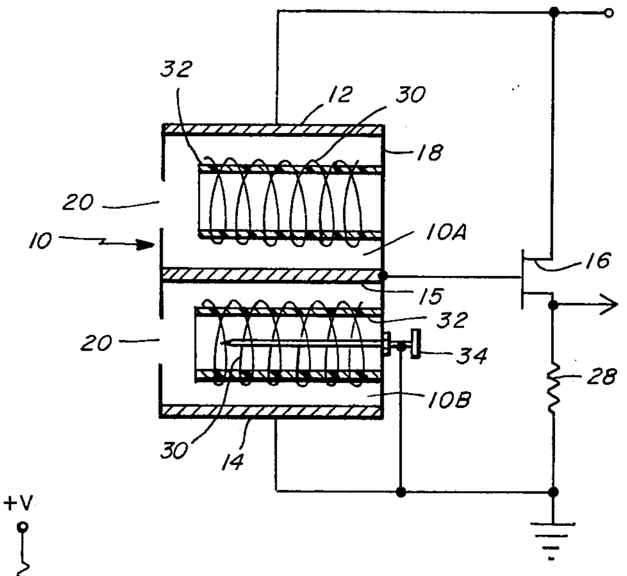
FIG. 2
FIG. 3
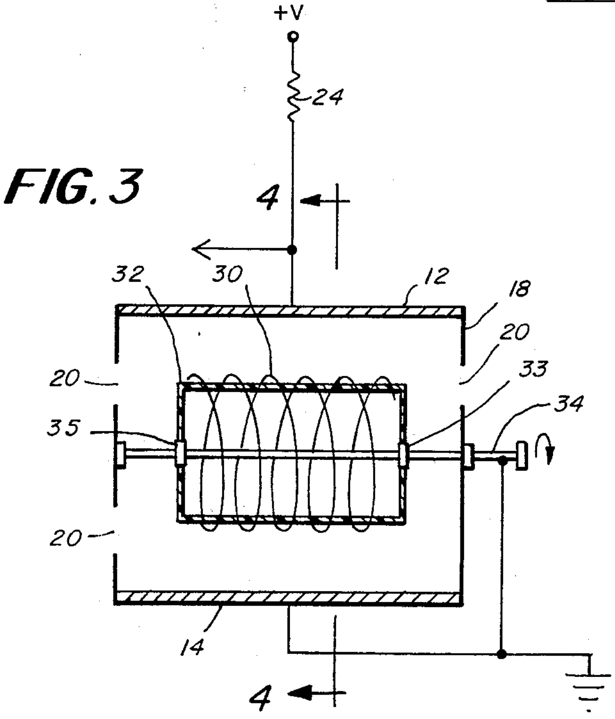
FIG. 4
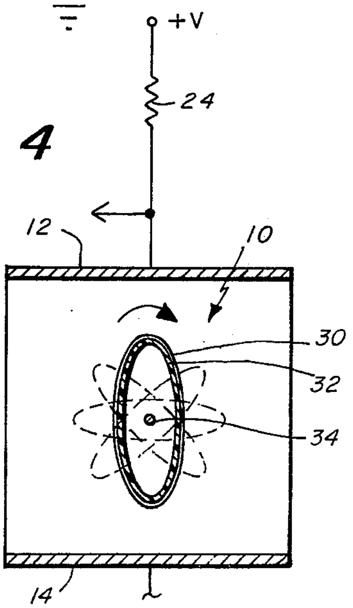

IONIZATION DETECTOR WITH IMPROVED RADIATION SOURCE

RELATED APPLICATION

This is a continuation-in-part of application Ser. No. 593,704 filed July 7, 1975.

BACKGROUND OF THE INVENTION

The present invention relates, in general, to ionization detectors. More particularly, this invention is concerned with an improved form of radiation source for use in ionization detectors. These detectors are usually used for sensing particles of combustion or aerosols found in the smoke generated from a fire.

In my copending application Ser. No. 593,704, there are discussed some of the advantages and disadvantages associated with the use of an alpha source of radiation for use in ionization detectors. For one thing, alpha sources are not as safe to use as beta sources of radiation. Also, when an alpha source is used, care must be taken to insure that the active sensing chamber is not saturated by the ionic current. To control the current, some known devices have main electrodes that are adjustable relative to the distance therebetween. When an alpha source is used and when the number of ion-pairs formed is excessive, the ionization current stabilizes and the device essentially functions as a constant current generator. In a plot of ion-pairs formed versus ionization current, the curve is fairly linear at low ionization currents and as more ion-pairs are formed the ionization current saturates. Some prior art patents such as U.S. Pat. No. 3,233,100 examine this effect and provide a special construction to maintain the ionization current at a low value. However, this provides a more complex structure. On the other hand if one uses a beta source, a far smaller number of ion-pairs are produced.

However, there is still a further disadvantage to using a relatively small radiation source even though it is a beta source. With a small source the space within the ionization chamber is not efficiently utilized due to the influence of the radiation becoming diffused away from the source. It therefore follows that the sensitivity to particles of combustion or aerosols varies depending upon the zone within the chamber. It has thus been found that it is desirable to have a homogeneous area of influence throughout the ionization chamber. Furthermore, when one desires to use a source of beta particles, it is especially important to have a homogeneous field of influence in the chamber.

Accordingly, one object of the present invention is to provide a radiation source, preferably a source of beta particles, that provides a homogeneous field within the radiation chamber.

Another object of the present invention is to provide a source of radiation for use in an ionization chamber and preferably a source of beta particles wherein the source is constructed to provide an increase ionic current and concurrently provide a homogeneous field of influence within the chamber.

SUMMARY OF THE INVENTION

To accomplish the foregoing and other objects of this invention, there is provided in one embodiment a beta radiation source in the form of a wound wire or ribbon. This wire or ribbon structure is suitably supported in the ionization chamber. The ionization chamber typically comprises at least a pair of conductive collector plates disposed at opposite ends of the chamber. The chamber also comprises an insulating portion disposed between the collector plates and having porting for permitting the smoke to filter into the ionization chamber for influencing the ionization current. The change in the ionization current is detected and an alarm condition is generated. The construction of the ionization chamber may be in the form shown in my copending application Ser. No. 593,704.

The radiation source is preferably spirally wound on an insulative support core. The chamber may also have an adjustable electrode of the type shown in my copending application Ser. No. 593,704.

In an alternate embodiment the radiation source may be wound in eliptical form and may be rotatable for providing at least limited adjustment of the ionization current in the chamber. In still another embodiment in accordance with the present invention, the radiation source may be constructed in a rather random arrangement with the source being in the form of a ribbon extending homogeneously throughout the chamber structure. The chamber structure may also be either a single chamber or a dual chamber arrangement.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a schematic diagram of a single chamber ionization detector and associated circuitry;

FIG. 2 is a schematic diagram similar to that shown in FIG. 1 for a dual chamber construction;

FIG. 3 is a schematic diagram like that shown in FIG. 1 for a different embodiment of the invention;

FIG. 4 is a cross-sectional view taken along line 4—4 of FIG. 3; and

DETAILED DESCRIPTION

Figure 5:
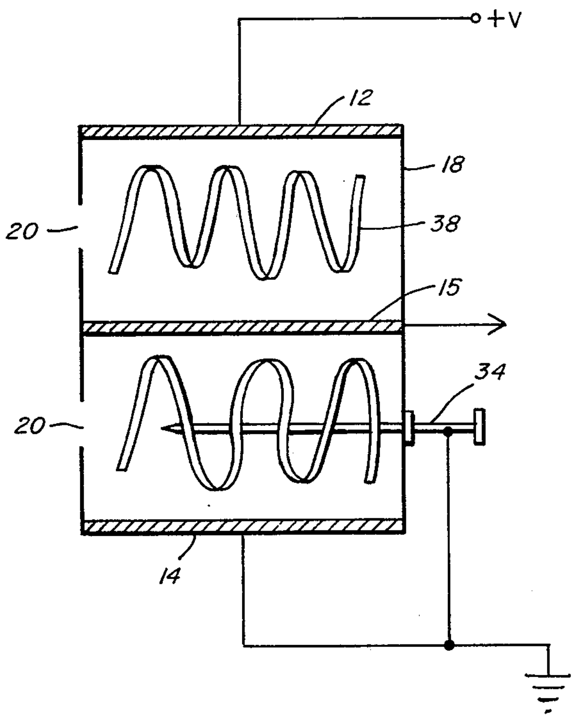
FIG. 5 is a diagram of a dual chamber detector including a radiation source of still a further design.

In FIG. 1 there is shown the ionization chamber 10 including collector plates 12 and 14, and circuitry associated with the chamber including field effect transistor 16. The chamber 10 is also defined by a cylindrical insulating member 18 preferably having a plurality of ports 20 coupled therethrough and disposed about the circumference of the member 18. In FIG. 1 and the other drawings of this application, the chamber 10 is shown in a somewhat schematic fashion. For a more detailed description of the chamber construction, reference is made herein to my copending application Ser. No. 593,704.

The plate 12 connects to node 22 and the plate 14 connects to ground, for example. The node 22 is preferably biased at one half the supply voltage V by the proper selection of resistor 24. Node 22 couples to the gate electrode of field effect transistor 16. The drain electrode of the transistor couples to the supply voltage V and the source electrode of the transistor couples by way of resistor 28 to ground potential.

The radiation source disposed in the chamber 10 is preferably a Nickel 63 radiation source of beta particles. This source is in the form of a wire, foil or ribbon 30 that is spirally wound around a core 32 constructed of an insulation material. The core 32 may be constructed in a mesh form permitting free passage of air therethrough. Also, the spiral 30 is loosely wound on the core to allow for free flow of air. The core 32 may be suitably supported within the chamber from the member 18 and supports the spiral 30 in a relatively fixed position. An adjusting screw or electrode 34 may also be provided extending into the chamber to adjust the ionization current as taught in my copending application Ser. No. 593,704.

When the chamber detects smoke, the ionization current increases and thus the voltage at node 22 changes. This change is detected by the field effect transistor 16 and an output signal is developed at one of the output electrodes of this transistor. Additional detection circuitry is usually used. However, so as not to obscure the concepts of this invention, a further description of the circuitry is not deemed necessary. My copending application Ser. No. 593,704 discloses circuitry for use with a chamber of the type shown herein.

In FIG. 2 like reference characters will be used to designate parts the same as those shown in FIG. 1. Thus, the ionization chamber comprises conductive collector plates 12 and 14. However, in FIG. 2 there is shown a dual chamber configuration including chambers 10A and 10B divided by a third collector plate 15. This embodiment does not use a resistor 24 but instead the plate 12 couples directly to the voltage source V and the plate 14 couples directly to ground potential. The intermediate plate 15 couples to the gate electrode of the transistor 16. The chamber is provided with openings 20 and there may also be provided an opening or passage in the plate 15 permitting communication between the chambers 10A and 10B.

In each of the chambers there is disposed the spiral of wire or ribbon 30 supported on the core 32. This arrangement may be identical to that shown and discussed with reference to FIG. 1. The filament 30 can be separate in each chamber or alternatively, each of the filaments 30 may be interconnected through an insulated slot in the plate 15. In FIG. 2 the adjusting screw or electrode 34 is shown extending into chamber 10B. This adjusting electrode can also be inserted into chamber 10A and can be connected to any of the collector plates or even to an independent reference voltage. In FIGS. 1 and 2 the adjusting electrode 34 is shown coupled to ground potential.

FIGS. 3 and 4 show a slightly different embodiment of the invention. Like reference characters are used in this embodiment as used in FIGS. 1 and 2. FIGS. 3 and 4 show a single chamber structure having an adjusting electrode 34. However, in this embodiment the adjusting electrode does not itself provide the adjusting. Rather, the core 32 supporting the filament or spiral 30 is suitably connected at points 33 and 35 to the elongated screw 34. In addition, the core has a non-circular spiral and is instead in an eliptical form as shown clearly in FIG. 4. In an alternate embodiment, the form may be rectangular with the spiral wound in a similar fashion around the core. FIG. 4 shows the core and filament in solid in one position and also shows, in dotted, three other alternate positions that it may assume. Actually, by means of rotating the screw 34 the radiation source can be disposed at virtually any position through the total 360°. In this way it is possible to alter the ionization current within the chamber much as the screw electrode 34 has adjusted the ionization current in the embodiment of FIG. 1.

In addition, it is possible to also use a second adjusting electrode which is of the type shown in FIGS. 1 and 2. This second electrode does not support the radiation source but is adjustable in itself to alter the ionization current.

FIG. 5 shows an embodiment quite like that shown in FIG. 2 for a dual chamber construction. This chamber includes the collector plates 12, 14 and 15 and the cylindrical member 18 for insulatively spacing these collector plates. An adjusting screw 34 is shown coupled to ground and extending into the lower chamber. In this embodiment the radiation sources in each of the two chambers is a wire or foil 38 which is not wound in a spiral form but is wound in a somewhat random fashion. It is desired that the foil 38 extend rather evenly throughout each of the chambers so that a homogeneous field is established in the chambers. Although no means of support is shown in FIG. 5 as this is only a schematic diagram, the foil or wire is suitably supported by means of a core or a rod having arms extending therefrom for supporting different points of the foil.

What is claimed is:

1. An ionization detector comprising:

means defining an ionization chamber having at least two spaced plates, means for biasing the plates to establish a predetermined ionization current in the chamber, a source of radiation disposed in the ionization chamber and being in the form of a wound ribbon means extending over an area of the chamber, and means supporting the source of radiation including a core about which the ribbon means is wound.

2. An ionization detector as set forth in claim 1 further comprising an adjustable electrode extending into the ionization chamber and adjustable as to its depth of penetration into the chamber.

3. An ionization detector as set forth in claim 1 wherein said ribbon means is wound in a non-circular spiral and said supporting means includes means permitting rotation of the spiral.

4. An ionization detector as set forth in claim 1 wherein said core is of cylindrical shape.

5. An ionization detector as set forth in claim 1 including an adjustable screw electrode disposed in the chamber and extending through the core.

6. An ionization detector as set forth in claim 1 wherein said ionization chamber includes two separate chambers with a radiation source disposed in each chamber.

7. An ionization detector comprising:

means defining an ionization chamber having at least two plates, means for biasing the plates to establish a predetermined ionization current in the chamber, a source of radiation disposed in the ionization chamber and being in the form of a ribbon extending over an area of the chamber, means supporting the source of radiation, and means for rotating the supporting means.

8. For an ionization detector including wall means defining a chamber and means associated with the chamber for establishing an ionization current in the chamber, the improvement comprising a radiation source disposed in the chamber and constructed in the form of a wire means to provide a homogeneous field of influence therein and means supporting the source of radiation including a core for supporting the wire means.

9. An ionization detector comprising:

means defining an ionization chamber having at least two spaced plates,
means for biasing the plates to establish a predetermined ionization current in the chamber,
a source of radiation disposed in the ionization chamber and being in the form of a wound wire means,
and means supporting the source of radiation including a core for supporting the wound wire means.

10. An ionization detector comprising;
wall means defining an ionization chamber,
means operatively associated with the chamber for biasing the chamber to establish an ionization current therein,
a source of radiation disposed in the ionization chamber including radioactive strip means,
and insulating core means for supporting the strip means and permitting air circulation substantially about the strip means.

11. An ionization detector comprising;
wall means defining an ionization chamber,
means operatively associated with the chamber for biasing the chamber to establish an ionization current therein,
a source of radiation disposed in the ionization chamber including relatively thin radioactive means,
means supporting the source of radiation in the chamber and means for rotating the supporting means.

12. An ionization detector comprising;
wall means defining an ionization chamber,
means operatively associated with the chamber for biasing the chamber to establish an ionization current therein,
a source of radiation disposed in the chamber in the form of a ribbon means,
and insulating core means for supporting the ribbon means and permitting air circulation thereabout.

13. An ionization detector comprising;
wall means defining an ionization chamber,
means operatively associated with the chamber for biasing the chamber to establish an ionization current therein,
a source of radiation disposed in the chamber in the form of a wire means,
and insulating core means for supporting the wire means and permitting air circulation thereabout.

* * * * *